(12) United States Patent
Goto et al.

(10) Patent No.: US 6,273,577 B1
(45) Date of Patent: *Aug. 14, 2001

(54) LIGHT GUIDE PLATE, SURFACE LIGHT SOURCE USING THE LIGHT GUIDE PLATE, AND LIQUID CRYSTAL DISPLAY USING THE SURFACE LIGHT SOURCE

(75) Inventors: Youichiro Goto, Gifu; Toru Nose, Ogaki; Michiaki Sato, Ichinomiya; Masahiro Higuchi, Anpachi-gun; Takanari Kusafuka, Yohro-gun, all of (JP)

(73) Assignee: Sanyo Electric Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,727

(22) Filed: Oct. 30, 1998

(30) Foreign Application Priority Data

| Oct. 31, 1997 | (JP) | 9-300443 |
| Oct. 31, 1997 | (JP) | 9-300444 |
| Dec. 8, 1997 | (JP) | 9-337077 |
| Dec. 11, 1997 | (JP) | 9-341236 |

(51) Int. Cl.⁷ ............... F21V 7/04; G02F 1/1335
(52) U.S. Cl. ............... 362/31; 362/561; 362/223; 349/65
(58) Field of Search ............... 362/31–33, 812, 362/26, 223, 559, 560, 561; 349/65

(56) References Cited

U.S. PATENT DOCUMENTS

| 4,460,939 | * | 7/1984 | Murakami et al. ............... 362/31 |
| 5,027,258 | * | 6/1991 | Schoniger et al. ............... 362/31 |
| 5,808,708 | * | 9/1998 | Oyama et al. ............... 362/31 |
| 5,810,463 | * | 9/1998 | Kawahara et al. ............... 362/31 |

FOREIGN PATENT DOCUMENTS 05011249  1/1993  (JP) ............... G02F/1/1335

* cited by examiner

Primary Examiner—Jon Henry
(74) Attorney, Agent, or Firm—Darby & Darby

(57) ABSTRACT

An outer light collecting portion 10 which sticks out of a light emission surface 14 to the light emission direction at the same time when a light guide plate is formed by resin forming with a mold. An area of a surface for collecting outer light is larger than that of a conventional light guide plate so as to collect outer light effectively. Light from a light source which is incidence through a light incident surface 12 reflects from a light reflection surface 13 and two side surface 11 of a light guide plate 1, and is emitted as synthesized light having the even directivity from a light emission surface 14.

4 Claims, 14 Drawing Sheets

LIGHT GUIDE PLATE, SURFACE LIGHT SOURCE USING THE LIGHT GUIDE PLATE, AND LIQUID CRYSTAL DISPLAY USING THE SURFACE LIGHT SOURCE

BACKGROUND OF THE INVENTION

1. Field of the Invention

The present invention relates to a light guide plate, a surface light source using the light guide plate, and a liquid crystal display, and more particularly, to a surface light source used for a back light of a liquid crystal display, a lighting advertisement, a traffic-control sign, etc., and a light guide plate provided for the surface light source and a back light type liquid crystal display such as a viewfinder etc.

2. Description of the Prior Art

Examples of a surface light source for a back light of a liquid crystal display (LCD) include one of a side light type having a transparent flat plate as a light guide plate. In such a surface light source, light from such light sources as a fluorescent light is incident from one of side end surfaces of a light guide plate composed of a transparent parallel flat plate or a flat plate having a wedge shape in cross section, the light is propagated throughout the whole area of the light guide plate utilizing total reflection inside the transparent flat plate, a part of the propagated light is changed into diffused reflected light at less than a critical angle by a light scattering reflective plate on the reverse surface of the light guide plate, and the diffused light is emitted from the surface of the light guide plate (see Japanese Utility Model Laid-Open No. 162201/1980, for example).

Examples of a surface light source for a back light also include one so adapted that a lens sheet having a projection of a triangular prism-type lenticular lens on its one surface, the other surface of which is smooth, is superimposed on the surface of a light guide plate provided for the above-mentioned surface light source with the surface of the projection directed upward, to diffuse its diffused emitted light uniformly and isotropically in a desired angular range utilizing a light focusing function of the lens (see, Japanese Utility Model Laid-Open No. 107201/1992, for example).

When the lens sheet is used in combination with a mat transparent diffusing plate (a mat transparent sheet), light energy of a light source is more intensively distributed in a desired restricted angular range, and diffused light higher in uniformity and isotropy can be obtained in the angular range, as compared with a light guide plate using only the mat transparent diffusing plate as disclosed in U.S. patent application Ser. No. 4,729,067.

As a measure to achieve higher luminance of a back light used for a liquid crystal display, there has recently been a tendency to employ such construction that two lenticular lens sheets are overlapped with each other at right angles (see Monthly Display, May 1996, pp. 35~pp. 39).

Furthermore, examples of a surface light source for a back light of a liquid crystal display include one that has an outer light collecting portion at side end surfaces of the light guide plate in order to use outer light, such as the sunlight and a light from a lighting apparatus as a secondary light source. That outer light collecting portion, having a circle shape in cross section, consists of a cylindrical lens (see Japanese Patent Laid-Open No. 11249/1993).

FIG. 19 is a schematic view of a liquid crystal display using the light guide plate. As shown in the figure, a liquid crystal display is provided with a liquid crystal panel 39 on the side of a light emission surface 34 which diffuses and emits the light of a light guide plate 30. In the case of using this liquid crystal display as a viewfinder for a digital video camera, for example, a body of a camera is positioned on the opposite side (the left side of the figure) of the light emission surface of the light guide plate 30, and a cameraman watches images from the right side of the liquid crystal panel 39 through light emitted from the light emission surface 34.

An outer light collecting portion 40 composed of a cylindrical lens having a circle shape in cross-section is provided at the upper end of the light guide plate 1 in order to collect outer light as secondary light. A surface of this cylindrical lens for collecting outer light (the face formed when the dotted-line A–A' in the figure moves in vertical direction to the paper) faces to the upper direction of the paper (the direction indicated as "the direction of the surface" in the figure), and is constructed so as to collect light from the upper side effectively.

In another situation in using liquid crystal display, however, it is desirable to exploit outer light collected not only from the upper side but also from a light emission surface. The construction in which outer light is taken only from the upper side can not enlarge an area of surface for collecting outer light, therefore, decreases the efficiency of collecting outer light and has a problem that the reduction of power consumption can not be achieved.

SUMMARY OF THE INVENTION

The present invention has been made for solving the above-mentioned problems and has for its object to reduce power consumption at the main light source by increasing the efficiency to collect outer light.

The second object of the present invention is to provide light guide plate which make it possible to abandon the main light source.

The third object of the present invention is to provide surface light source using the light guide plate and liquid crystal display.

In order to attain the above-mentioned objects, the light guide plate of a first embodiment in the present invention is formed of resin in one body and is provided with an outer light collecting portion to collect outer light, a light emission surface for emitting the outer light collected from the outer light collecting portion, and the outer light collecting portion sticks out of the light emission surface to the light emission direction.

In order to attain the above-mentioned objects, the light guide plate of a second embodiment in the present invention is formed of resin in one body and is provided with an outer light collecting portion to collect outer light, a light emission surface for emitting the outer light collected through the outer light collecting portion and a light reflection surface, which is opposite to the light emission surface, for reflecting the outer light collected through the outer light collecting portion, and the outer light collecting portion sticks out of the light emission surface an the light reflection surface.

Further, the light guide plate of the present invention which is formed of resin in one body is provided with an outer light collecting portion to collect outer light, a light emission surface for emitting the outer light collected through the outer light collecting portion and a light reflection surface, which is opposite to the light emission surface, for reflecting the outer light collected through the outer light collecting portion, and the outer light collecting portion sticks out of the light emission surface and the light reflection surface, and the outer light collecting portion is thicker than the light emission surface and the light reflection surface.

In order to attain the above-mentioned objects, the light guide plate of the third embodiment in the present invention is formed of resin in one body and is provided with an outer light collecting portion for collecting outer light at the upper end of the light guide plate, and the surface for collecting outer light of the outer light collecting portion faces to the upper slant direction.

Further, in order to attain the above-mentioned objects, the light guide plate of the present invention is formed of resin in one body and is provided with an outer light collecting portion for collecting outer light and a light emission surface for emitting the collected outer light through the outer light collecting portion. A first lens portion consisting a plurality of lenticular unit lenses in a recessed or projected shape is formed on the light emission surface, and the plurality of lenticular unit lenses in the first lens portion are so arranged that their respective ridge lines are nearly parallel to each other and are nearly perpendicular to the longitudinal direction of the outer light collecting portion.

The vertical angle of a plurality of lenticular unit lenses in the first lens portion is set in the range of 125° to 165° in the light guide plate.

The vertical angle of a plurality of lenticular unit lenses in the first lens portion is in the vicinity of 150°.

Any one of the above-mentioned light guide plate is provided with a second lens portion consisting a plurality of lenticular unit lenses, which are formed of the same resin as that of the light guide plate, in a recessed or projected shape is formed on the light reflection surface which is opposite to the light emission surface, and the plurality of lenticular unit lenses in the second lens portion are so arranged that their respective ridge lines are nearly parallel to each other and are nearly perpendicular to the ridge lines of the plurality of lenticular unit lenses in the first lens portion.

The vertical angle of a plurality of lenticular unit lenses in the second lens portion is set in the range of 125° to 165° in the light guide plate.

The vertical angle of a plurality of lenticular unit lenses in the second lens portion is in the vicinity of 150°.

The surface light source of the present invention is provided with each one of the above-mentioned light guide plate and a light source which is mounted on a surface except for the outer light collecting portion and the light emission surface of the light guide plate.

A liquid crystal display of the present invention is provided with each one of the above-mentioned light guide plate and a liquid crystal panel mounted near the light emission surface of the light guide plate.

Further, the outer light collecting portion of the light guide plate does not stick out of the display screen of the liquid crystal display to the direction of light emission in the liquid crystal display.

The foregoing and other objects, features, aspects and advantages of the present invention will become more apparent from the following detailed description of the present invention when collected conjunction with the accompanying drawings.

PREFERRED EMBODIMENT OF THE PRESENT INVENTION

A first embodiment of the present invention will be described in detail with reference to the drawings.

Figure 1:
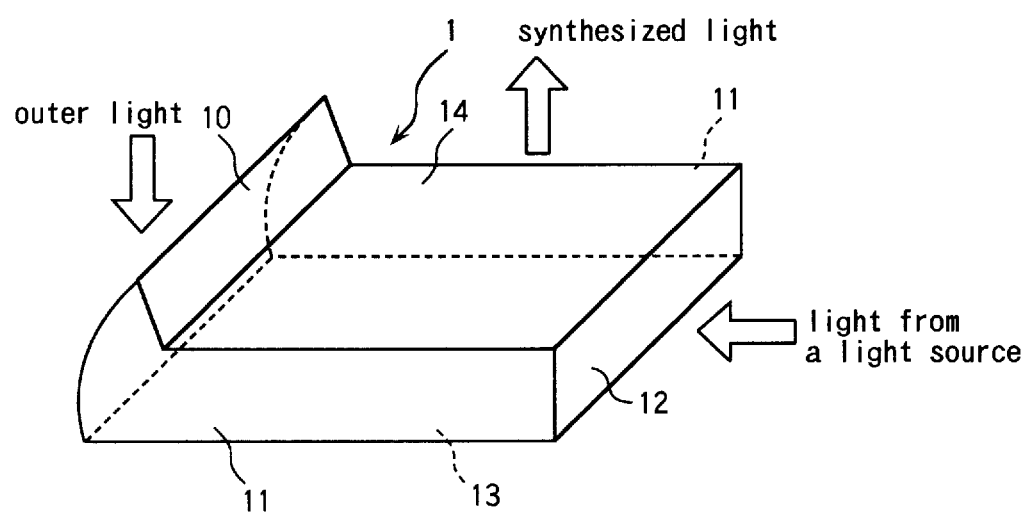
FIG. 1 is a perspective view showing a light guide plate according to a first embodiment of the present invention.

FIG. 1 is a perspective view showing a light guide plate according to a first embodiment.

As for a light guide plate 1, when a body of a light guide plate 1 is formed by resin forming with a mold, an outer light collecting portion 10, which will be described later, is also formed at the same time.

The outer light collecting portion 10 collects outer light such as the sunlight and light from a lighting apparatus as a secondary light. The outer light collecting portion 10 is formed so as to stick out of a light emission surface 14, which will be described later, to the direction to which synthesized light emits (that is, the upper direction in the figure). Accordingly, the surface area of an outer light collecting surface is larger than that of a conventional light guide plate.

As for a light incidence surface 12, described as follow, light, irradiated from a light source (not shown) provided so as to be adjacent and approximately parallel to the light incident surface 12, is incidence. Light sources can be provided on either of both side surfaces 11 to make them light incident surfaces.

As for a light reflection surface 13, after resin forming, dot pattern printing is carried out and a reflection plate made from Aluminum or the like (not shown) is mounted to prevent light leakage and raise the reflection efficiency.

As for a light emission surface 14, light, which is incident from the outer light collecting portion 10 and the light incidence surface 12, reflects from the light reflection surface 13 and both side surfaces of a light guide plate 1, and most of the incident light is emitted, in the end, as a synthesized light having the even directivity. Leakage prevention materials, such as white tape, is provided with the side surfaces 11 to prevent the leakage of light.

The material of the light guide plate 1 is selected from transparent materials. Generally, acrylic resin or polycarbonate resin is used. The shape of the light guide plate is parallel and flat plate or flat plate having a wedge shape in cross section. The thickness of the light guide plate is approximately 1 to 10 mm in general.

Examples of the other transparent materials include acrylic ester such as polymethyl methacrylate and polyacrylic acid methyl, methacrylate ester alone or its copolymers, polyester such as polyethylene terephthalate and polybutylene terephthalate, thermoplastic resin such as polycarbonate, polystyrene, and polymethylpentene, acrylate such as multifunctional urethane acrylate and polyester acrylate cross-linked by ultraviolet rays or electron beams, transparent resin such as unsaturated polyester, transparent glass, and transparent ceramics.

FIGS. 2A to 2G are front views of an outer light collecting portion of a light guide plate, according to the present invention, to illustrate a shape available, particularly for an outer light collecting portion.

Figure 2A:
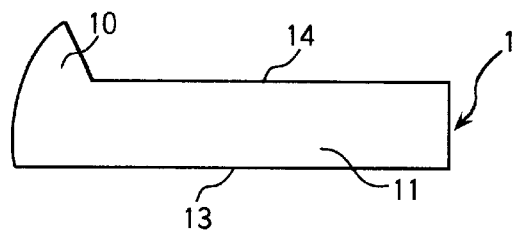
FIGS. 2A to 2G are schematic views showing a construction of an outer light collecting portion of a light guide plate according to a first embodiment of the present invention.

A light guide plate 1, shown in FIG. 2A, has the same shape as the light guide plate 1 shown in FIG. 1 and the left side of the outer light collecting portion 10 has a circle shape in cross section and the right side of the outer light collecting portion 10 has a oblique line shape.

Figure 2B:
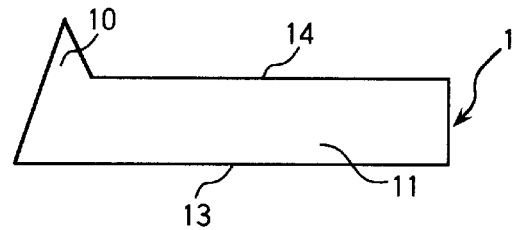

Both left and right side of an outer light collecting portion of a light guide plate 1, shown in FIG. 2B, have an oblique line shape.

Figure 2C:
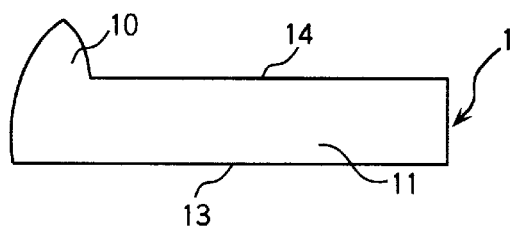

Both left and right side of an outer light collecting portion of a light guide plate 1, shown in FIG. 2C, have a circle shape in cross section.

Figure 2D:
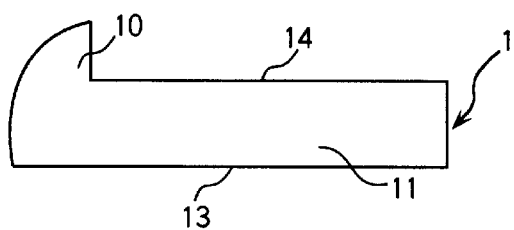

The left side of the outer light collecting portion 10 in a light guide plate 1, shown in FIG. 2D, has a circle shape in cross section and the right side of the outer light collecting portion 10 has an perpendicular line shape.

Figure 2E:
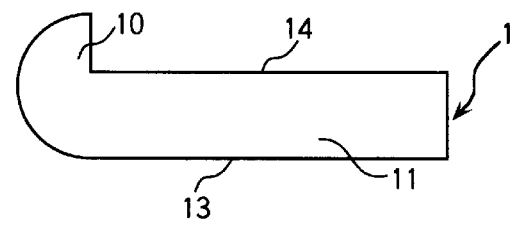

The left side of the outer light collecting portion 10 of a light guide plate 1, shown in FIG. 2E, has a semicircle shape in cross section and the right side of the outer light collecting portion 10 has a perpendicular line shape.

Figure 2F:
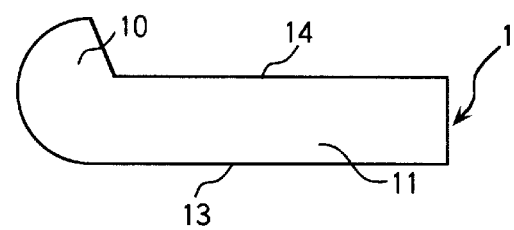

The left side of the outer light collecting portion 10 of a light guide plate 1, shown in FIG. 2F, has a semicircle shape in cross section and the right side of the outer light collecting portion 10 has a perpendicular line shape.

Figure 2G:
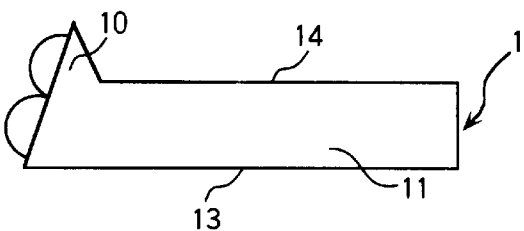

A light guide plate 1 shown in FIG. 2G forms a plurality of fisheye lenses 1f on the left side of an outer light collecting portion 10 of the light guide plate 1 shown in FIG. 2B.

The function of the light guide plate according to the present invention will be described using FIG. 1.

Such outer lights as the outside sunlight and the fluorescent light in a room are incident to the outer light collecting portion of a light guide plate 10. The outer light collecting portion 10 sticks out of the light emission surface 14 to the light emission direction. Therefore, the outer light collecting portion has much larger area of a surface of collecting outer light, compared to an outer light collecting portion of a conventional light guide plate (see the figure), and outer light can be received in by an outer light collecting portion effectively. Accordingly, when a liquid crystal display provided with a light guide plate of the present invention is adopted as a viewfinder etc., sufficient lighting can make it unnecessary to turn on a light source, and the reduction of power consumption can be achieved.

When a light source is turned on, light that is incident from a light source to a light incident surface 12 and outer light reflect from the light reflection surface 13 and the two side surfaces 11 of the light guide plate 1, and are emitted from the light emission surface 14 as a synthesized light having the even directivity.

Figure 3:
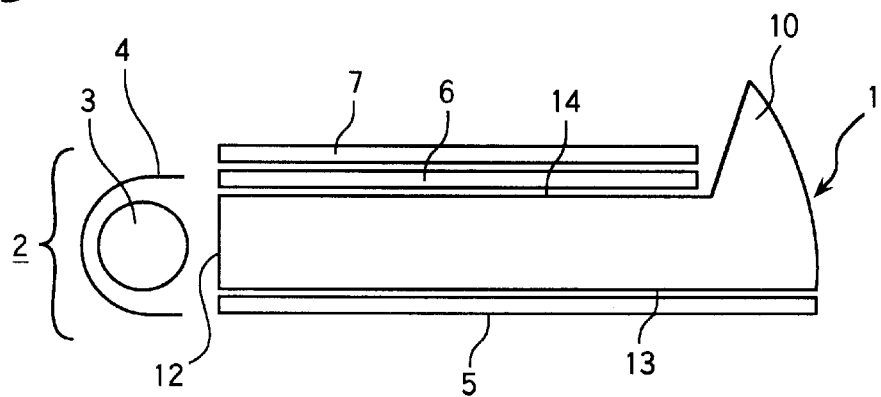
FIG. 3 is a schematic view showing a surface light source using a light guide plate according to a first embodiment of the present invention.

FIG. 3 is a schematic view showing a surface light source using a light guide plate according to the first embodiment of the present invention.

A surface light source 2 is composed of the light guide plate 1, the light source 3 such as a fluorescent tube etc. of the first embodiment, any kind of control circuits (not shown), and so on. The control circuits include a circuit which detects the total amount of light emitted from a light emission surface of a light guide plate 1, adjusts the electric power to optimize the amount of light emission and supplies the electric power to the light source 3.

Light emitted from the light source 3 reflects from a reflector 4 and enters the inside of the light guide plate 1 through a light incidence surface 12 of a light guide plate 1 and outer light such as the natural light enters the inside of the light guide plate 1 through an outer light collecting portion 10 of a light guide plate 1. Those lights are reflected from a reflection plate 5 mounted under the light reflection surface 13 and from the side end surfaces 11, are focused repeatedly, and are emitted from the light emission surface 14 of the light guide plate 1 to a diffusion plate 6. Light that is incident in the diffusion plate 6 is diffused uniformly and isotropically in a desired angular range through the diffusion plate 6 and a lens sheet 7, and is emitted from the lens sheet 7.

Figure 4A:
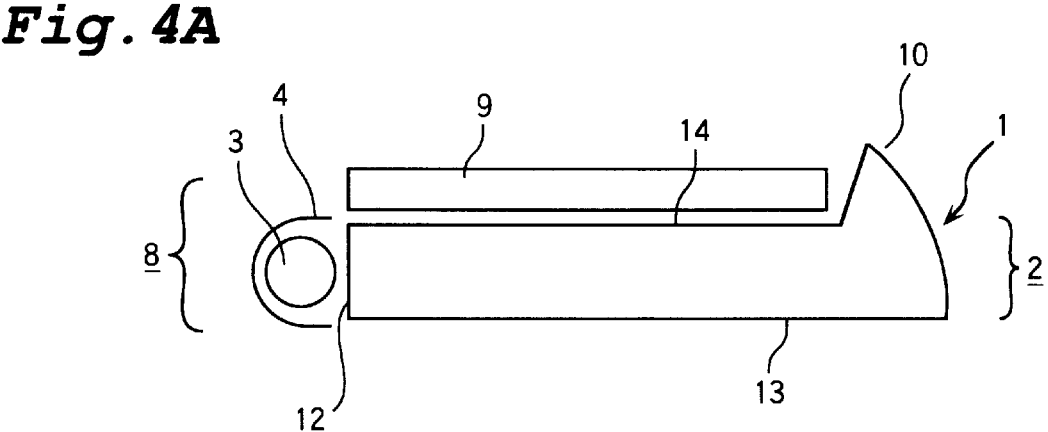
FIGS. 4A and 4B are schematic views showing a liquid crystal display using a surface light source shown in FIG. 3.
Figure 4B:
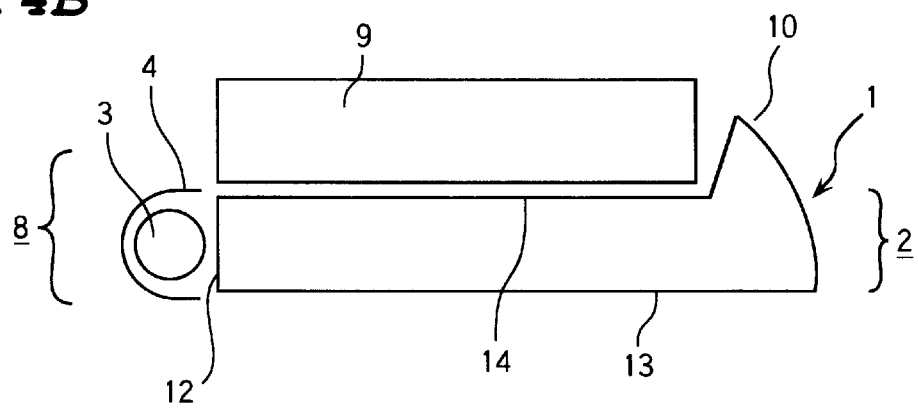

FIGS. 4A and 4B are schematic views showing a liquid crystal display provided with a surface light source of the present invention. FIG. 4A shows an outer light collecting portion 10 which sticks out of the display of liquid crystal panel 9 to the light emission direction and FIG. 4B shows an outer light collecting portion 10 which does not stick out of the display of liquid crystal panel 9 to the light emission direction. Although both of these two liquid crystal displays can collect outer light effectively, an outer light collecting portion 10 of FIG. 4B makes it possible to prevent damages on an outer light collecting portion itself and injuries of users and, further, does not interfere good and flexible design, because it does not stand out from the display of liquid crystal panel 9.

As shown in the figures, the liquid crystal display 8 comprises a liquid crystal panel 9 and a surface light source 2 of the present invention. Light diffused uniformly and isotropically and emitted from the surface light source 2 enter the liquid crystal panel 9. The liquid crystal display may be one that uses only outer light obtained from a light guide plate 1, removing the light source 3 from the surface light source 2.

From these explanation, the light guide plate according to the first embodiment of the present invention has an outer light collecting portion that sticks out of the light emission surface and that can enlarge the area of collecting outer light, as compared with a conventional light guide plate. Therefore, it is possible for a light guide plate to collect outer light including the sunlight and a room light as a main light effectively.

In the surface light source and the liquid crystal display of the present invention, the efficiency of collecting outer light is improved by using the light guide plate. When a certain amount of light emission is obtained, it is possible to reduce the power supplied to the light source, further more, to disuse the light source according to circumstances.

In the liquid crystal display of the present invention, the outer light collecting portion of a light guide plate that does not stick out of the liquid crystal display can secure the safety of a user due to the less factor of causing injuries, and further, prevent damages on the outer light collecting portion itself and maintain the flexibility in design.

A second embodiment of the present invention will be described in detail with reference to the drawings.

Figure 5:
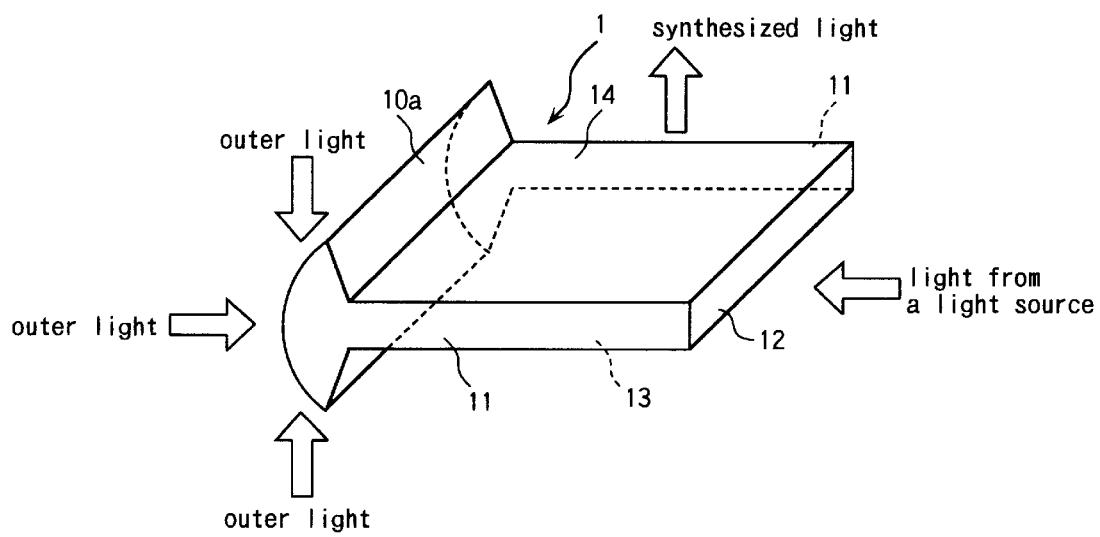
FIG. 5 is a perspective view showing a light guide plate according to a second embodiment of the present invention.

FIG. 5 is a perspective view showing a light guide plate according to a second embodiment of the present invention.

As for a light guide plate 1 of a second embodiment as well as a first embodiment, when a body of a light guide plate 1 is formed by resin forming with a mold, an outer light collecting portion 10a is also formed at the side end of the light guide plate 1 at the same time. The light guide plate 1 of the second embodiment has the same construction as that of the light guide plate 1 of the first embodiment except for the outer light collecting portion 10a. So the reference numerals are affixed for the same parts, and the explanation is omitted for avoiding duplication of the description.

The outer light collecting portion 10a sticks out of a light emission surface 14 and a light reflection surface 13, which will be described later, to the upper and lower direction of the figure. So an area of a surface for collecting outer light is enlarged as compared with a conventional light guide plate. The outer light collecting portion 10a has an approximate fan shape in cross section and the end of the outer light collecting portion 10a is a cylindrical lens of a semicircle shape. The effect of a lens enable the outer light collecting portion 10a to collect outer light not only from the above direction but also from the side direction, the lower slant direction, and the upper slant direction effectively. The outer light collecting portion 10a is not limited to a cylindrical lens of a fan shape, but it may be a trapezoid shape in which a lens is not formed and the surface is flat.

FIGS. 6A to 6E are front views of an outer light collecting portion of a light guide plate, according to the second embodiment of the present invention, to illustrate a shape available, particularly, for an outer light collecting portion.

Figure 6A:
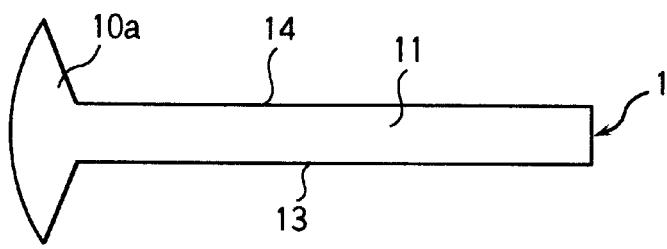
FIGS. 6A to 6E are schematic views showing a construction of an outer light collecting portion of a light guide plate according to a second embodiment of the present invention.

A light guide plate 1, shown in FIG. 6A, is the same as that shown in FIG. 5 and has an approximate fan shape. The left side of the outer light collecting portion 10a has a circle shape in cross section and the right side of the outer light collecting portion 10a has an oblique line shape.

Figure 6B:
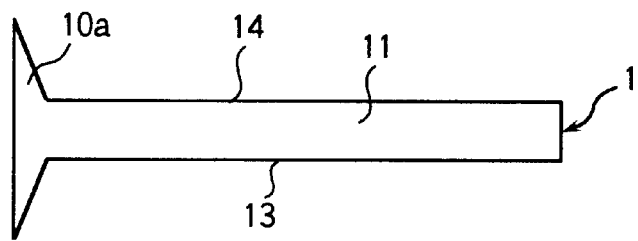

A light guide plate 1, shown in FIG. 6B have an approximate trapezoid shape and the left side of the collecting portion 10a is flat and the right side of the collecting portion has a oblique line shape.

Figure 6C:
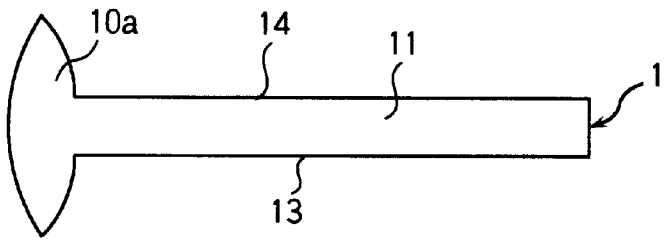

Both left and right side of the outer light collecting portion 10a of a light guide plate 1, shown in FIG. 6C, have a circle shape in cross section.

Figure 6D:
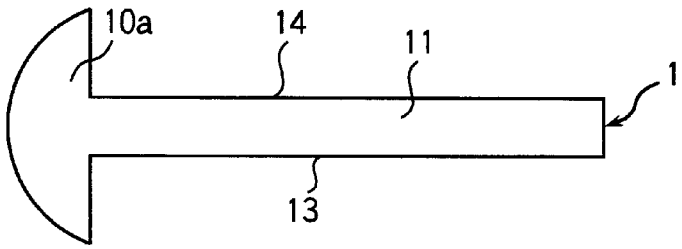

The left side of the outer light collecting portion 10a of a light guide plate 1, shown in FIG. 6D, has a circle shape in cross sectional and the right side of the outer light collecting portion 10a has a perpendicular line shape.

Figure 6E:
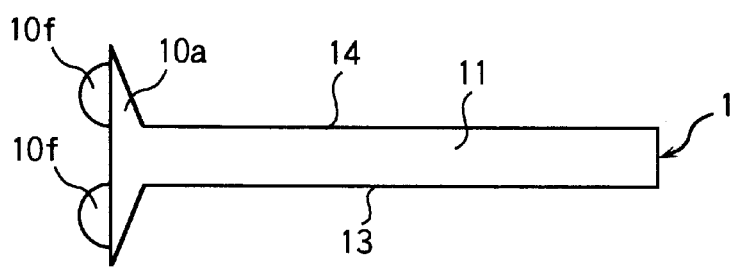

A light guide plate 1 shown in FIG. 6E forms a plurality of fisheye lenses 10f on the left side of the outer light collecting portion 10a in the light guide plate 1 shown in FIG. 6B.

The material of the light guide plate 1 is selected from transparent materials that are the same as those of the first embodiment. Generally, acrylic resin or polycarbonate resin is used. The shape of the light guide plate 1 is parallel and flat plate or flat plate having a wedge shape in cross section. The thickness of the light guide plate is approximately 1 to 10 mm in general.

Examples of the other transparent materials are the same as those of the first embodiment.

The function of the light guide plate according to the second embodiment of the present invention will be described using FIG. 5.

such outer lights as the outside sunlight and the fluorescent light in a room are incident effectively to an outer light collecting portion 10a of the light guide plate 1. Accordingly, when a liquid crystal display provided with a light guide plate of the present invention is adopted as a liquid crystal monitor etc., which displays the image, of a digital still camera and a video camera or the like, sufficient lighting can make it unnecessary to turn on a light source, and the reduction of power consumption by such kinds of a camera apparatus itself can be achieved.

When a light source is turned on, light that is incident from the light source through a light incident surface 12 and outer light which is collected through the outer light collecting portion 10a reflect from the light reflection surface 13 and the two side surfaces 11 of the light guide plate 1, and are emitted from the light emission surface 14 as a synthesized light having the even directivity.

Figure 7:
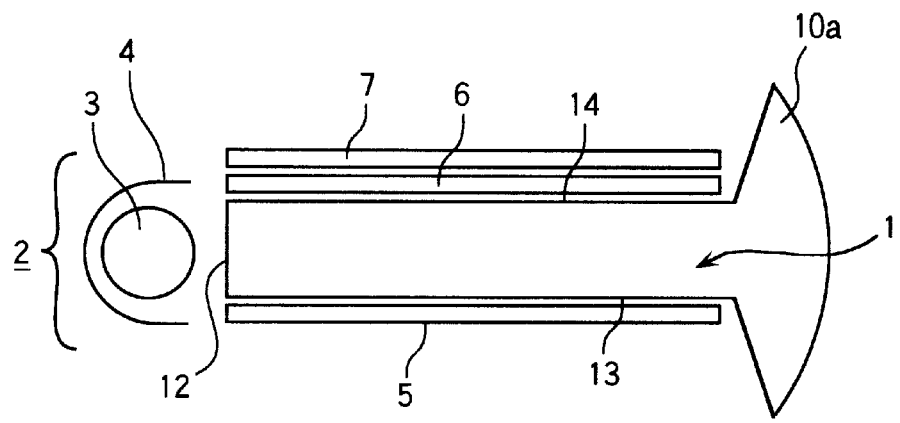
FIG. 7 is a schematic view showing a surface light source using a light guide plate according to a second embodiment of the present invention.

FIG. 7 is a schematic view showing a surface light source using a light guide plate according to the second embodiment of the present invention.

A surface light source 2 is composed of the light guide plate 1, the light source 3 such as a fluorescent tube etc. of the second embodiment, any kind of control circuits (not shown), and so on. The control circuits include a circuit which detects the total amount of light emitted from a light emission surface of a light guide plate 1, adjusts the electric power to optimize the amount of light emission and supplies the electric power to the light source 3.

Light emitted from the light source 3 reflects from a reflector 4 and enters the inside of the light guide plate 1 through a light incidence surface 12 of a light guide plate 1 and outer light such as the natural light enters the inside of the light guide plate 1 through an outer light collecting portion 10a of a light guide plate 1. Those lights are reflected from a reflection plate 5 mounted under the light reflection surface 13 and from the side end surfaces 11, are focused repeatedly, and are emitted from the light emission surface 14 of the light guide plate 1 to a diffusion plate 6. Light that is incident in the diffusion plate 6 is diffused uniformly and isotropically in a desired angular range through the diffusing plate 6 and a lens sheet 7, and is emitted from the lens sheet 7.

Figure 8A:
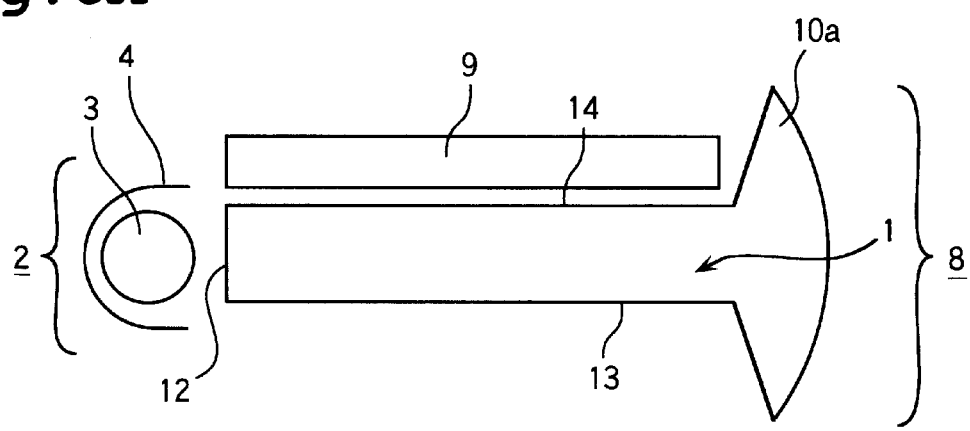
FIGS. 8A and 8B are schematic views showing a liquid crystal display using a surface light source shown in FIG. 7.
Figure 8B:
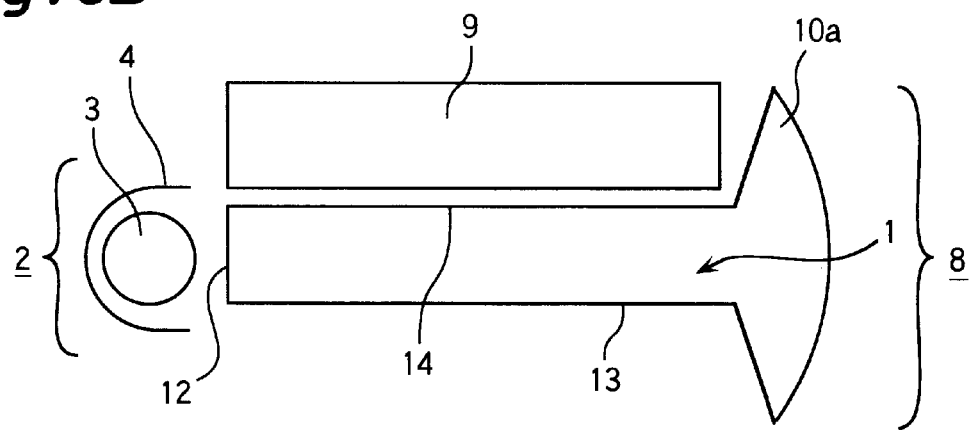

FIGS. 8A and 8B are schematic views showing a liquid crystal display provided with a surface light source of the present invention. FIG. 8A shows an outer light collecting portion 10a which sticks out of the display of liquid crystal panel 9 to the light emission direction and FIG. 8B shows an outer light collecting portion 10a which does not stick out of the display of a liquid crystal panel 9 to the light emission direction. Although both of these two liquid crystal displays can collect outer light effectively, the outer light collecting portion 10a of FIG. 8B makes it possible to prevent damages on the outer light collecting portion itself and injuries of users and, further, does not interfere good and flexible design, because it does not stand out from the display of the liquid crystal panel 9.

Light diffused uniformly and isotropically and emitted from the surface light source 2 enters the liquid crystal panel 9. The liquid crystal display may be one that uses only outer light obtained from a light guide plate 1, removing a light source 3 from the surface light source 2.

A third embodiment of the present invention will be described in detail with reference to the drawings.

Figure 9:
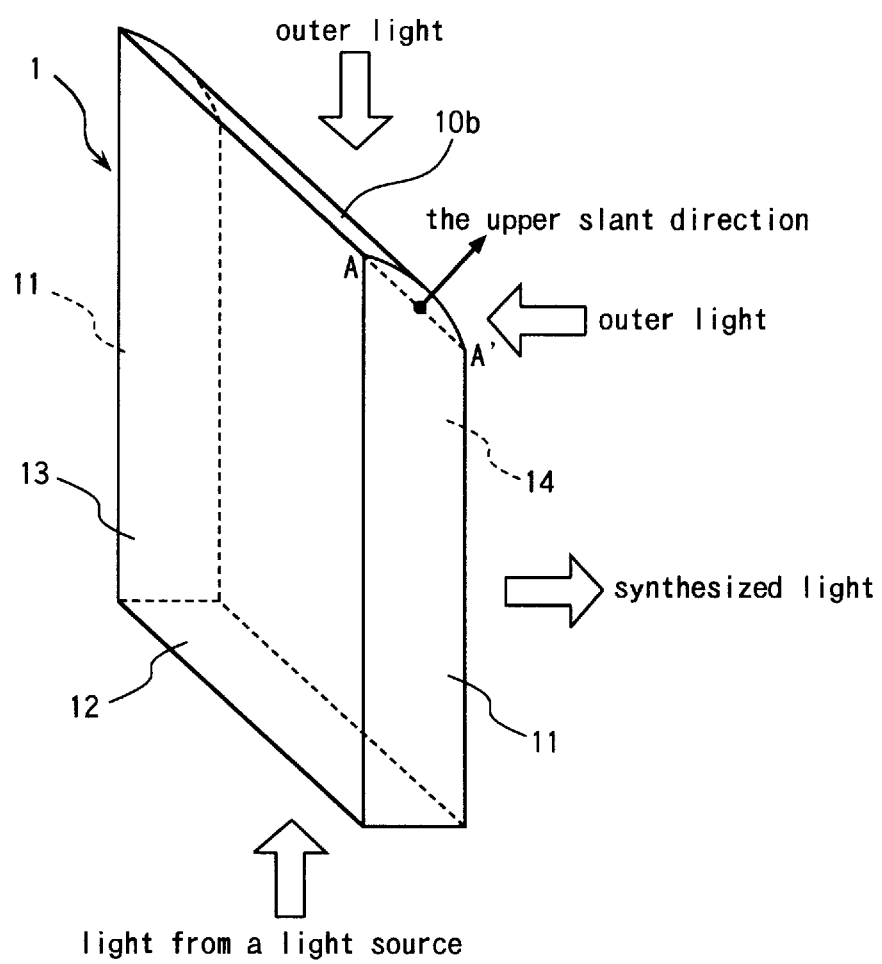
FIG. 9 is a perspective view showing a light guide plate according to a third embodiment of the present invention.

FIG. 9 is a perspective view showing a light guide plate according to a third embodiment.

As for a light guide plate 1 of a third embodiment as well as a first embodiment, when a body of the light guide plate 1 is formed by resin forming with a mold, an outer light collecting portion 10b is also formed at the side end of the light guide plate 1 at the same time. The light guide plate 1 of the third embodiment has the same construction as that of the light guide plate 1 of the first embodiment except for the outer light collecting portion 10b. So the same reference numerals are affixed for the same parts, and the explanation is omitted for avoiding duplication of the description.

The outer light collecting portion 10b consists of a cylindrical lens having a semicircle shape in cross section, and the surface for collecting outer light (the face formed by sliding the dotted line A–A' to the another side surface 11 in the figure) faces to the direction indicated by the black arrow (the direction indicated as the upper slant direction in the figure). Therefore, outer light from the upper slant direction can be received the most, and further outer light from the above and side direction can be received effectively. The outer light collecting portion 10b is not limited to a cylindrical lens in a circle shape, but it may be a trigonal prism, for example, as long as the surface for collecting outer light faces the upper slant direction.

The material of the light guide plate 1 is selected from transparent materials that are the same as those of the first embodiment. Generally, acrylic resin or polycarbonate resin is used. The shape of the light guide plate 1 is parallel and flat plate or flat plate having a wedge shape in cross section. The thickness of the light guide plate is approximately 1 to 10 mm in general.

Examples of the other transparent materials are the same as those of the first embodiment.

The function of the light guide plate according to the third embodiment of the present invention will be described using FIG. 9.

Figure 19:
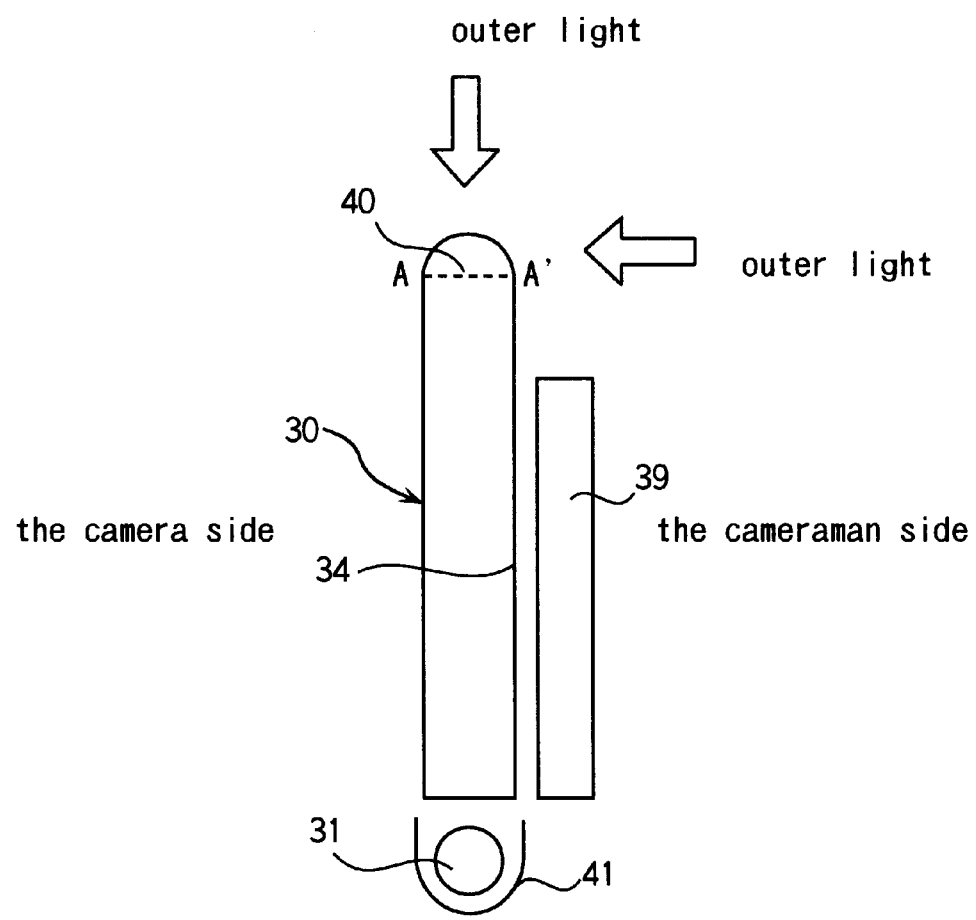
FIG. 19 is a schematic view showing a liquid crystal display using a conventional light guide plate.

The outside sunlight and such outer lights as the fluorescent light in a room are incident to an outer light collecting portion 10b of a light guide plate 1. The surface for collecting outer light of the outer light collecting portion 10b faces the upper slant direction, outer light that is incident mainly from the upper slant direction can be received by the outer light collecting portion 10b effectively as compared to a conventional light guide plate (see FIG. 19). Accordingly, when a liquid crystal display provided with a light guide plate of the present invention is adopted as a viewfinder etc., sufficient lighting can make it unnecessary to turn on a light source, and the reduction of power consumption can be achieved.

When a light source is turned on, light that is incident from a light source through a light incidence surface 12 and outer light reflects from a light reflection surface 13 and the two side surfaces 11 of the light guide plate 1, and are emitted from the light emission surface 14 as a synthesized light having the even directivity.

Figure 10:
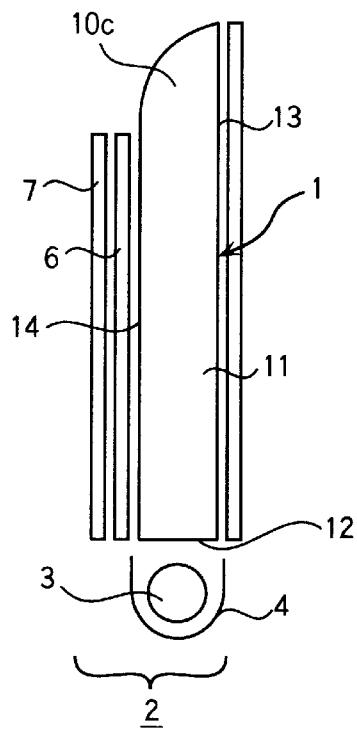
FIG. 10 is a schematic view showing a surface light source using a light guide plate according to a third embodiment of the present invention.

FIG. 10 is a schematic view showing a surface light source of the present invention.

A surface light source 2 is composed of the light guide plate 1, the light source 3 such as a fluorescent tube etc. of the present invention, any kind of control circuits (not shown), and so on. The control circuits include a circuit which detects the total amount of light emitted from a light emission surface of a light guide plate 1, adjusts the electric power to optimize the amount of light emission and supplies the electric power to the light source 3.

Light emitted from the light source 3 reflects from a reflector 4 and enters the inside of the light guide plate 1 through a light incidence surface 12 of a light guide plate 1 and the outer light such as the natural light enters the inside of the light guide plate 1 through an outer light collecting portion 10b of a light guide plate 1. Those lights are reflected from a reflection plate 5 mounted under the light reflection surface 13 and from the side end surfaces 11, are focused repeatedly, and are emitted from the light emission surface 14 of a light guide plate 1 to a diffusion plate 6. Light that is incident in the diffusion plate 6 is diffused uniformly and isotropically in a desired angular range through the diffusing plate 6 and a lens sheet 7 and is emitted from the lens sheet 7.

Figure 11:
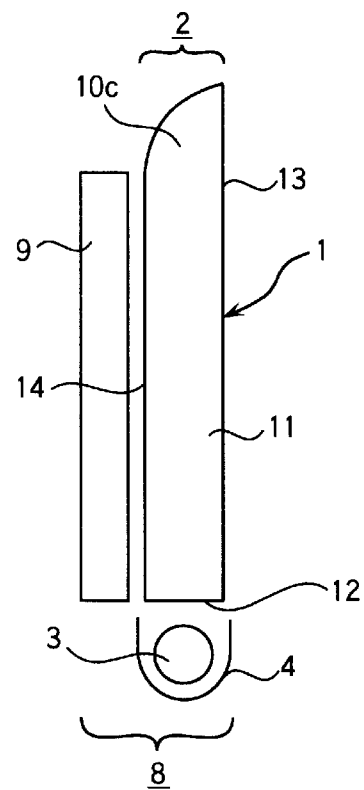
FIG. 11 is a schematic view showing a liquid crystal display using a surface light source shown in FIG. 7.

FIG. 11 is a schematic view showing a liquid crystal display provided with a surface light source of the present invention.

The liquid crystal display 8 comprises a liquid crystal panel 9 and a surface light source 2 of the present invention. The light diffused uniformly and isotropically and emitted from the surface light source 2 enters a liquid crystal panel 9. The liquid crystal display may be one that uses only outer light obtained from the light guide plate 1, removing the light source 3 from the surface light source 2.

Explanation will be made on the preferable embodiment applied to the bodies of the light guide plates. The embodiment aims to reduce lenticular lens sheets to one or disuse lens sheets, cut off the cost for parts and fabrication, and provide a surface light source that can reduce the power consumption at the main power supply and disuse a main light surface.

Figure 12A:
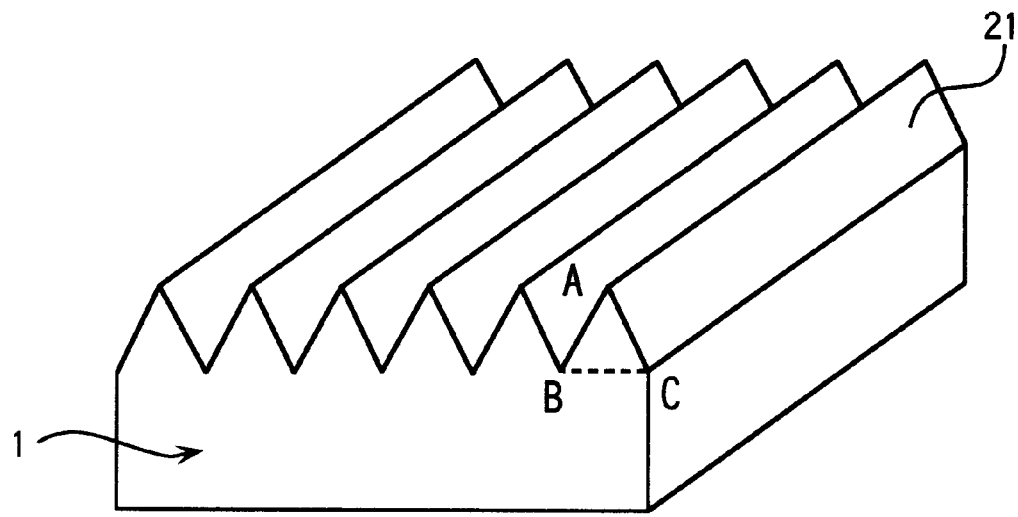
FIGS. 12A and 12B are perspective views showing a light guide plate according to the present invention.
Figure 12B:
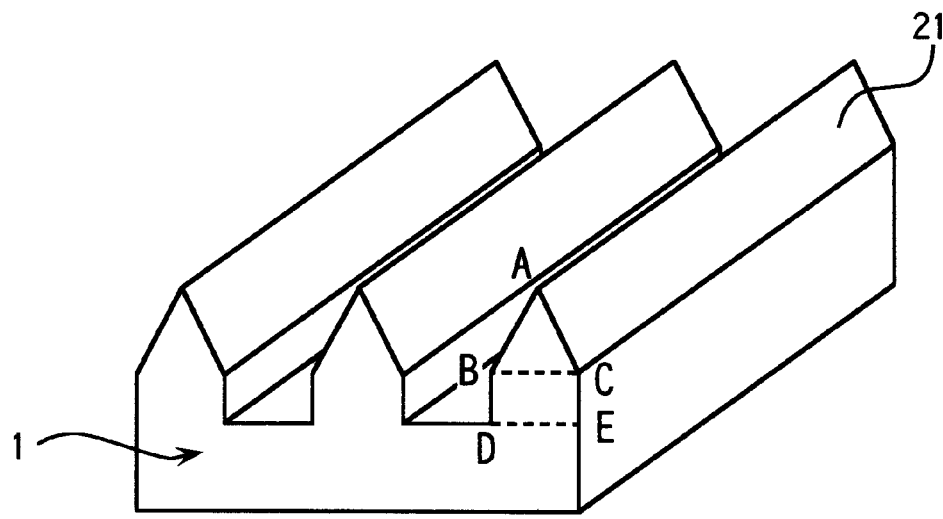

FIGS. 12A and 12B are perspective views showing a light guide plate according to the embodiment. The following terms will be defined using the drawings.

A lenticular unit lens means a triangular prism with a triangle formed by vertexes A, B and C taken as its base in FIG. 12A, and a pentagonal prism with a pentagon formed by vertexes A, B, D, E and C taken as its base in FIG. 12B. The lenticular unit lenses 21 illustrated herein are mere examples, not limitations, and may be a column, a cylindroid or a polygon prism. Although, in FIGS. 12A and 12B, the lenticular unit lens 21 is one in a projected shape, it may be one in a recessed shape, which is not illustrated.

A triangular prism portion of the lenticular unit lens means a triangular prism with a triangle formed by vertexes A, B and C taken as its base in both FIGS. 12A and 12B.

The vertex of the triangular prism portion means a vertex A in both FIGS. 12A and 12B.

An angle at the vertex A of the triangular prism portion means an angle formed by the side connecting the vertexes A and B and the side connecting the vertexes A and C in both FIGS. 12A and 12B.

Figure 13A:
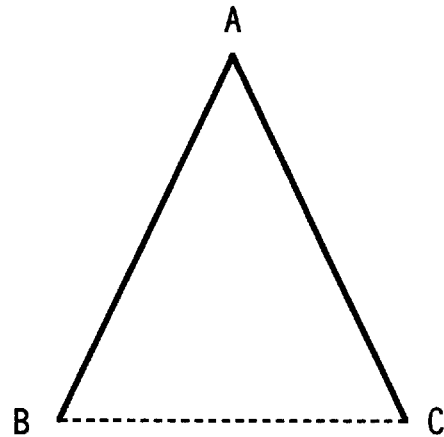
FIGS. 13A, 13B and 13C are schematic views showing a cross-sectional shape of a triangular prism portion.
Figure 13B:
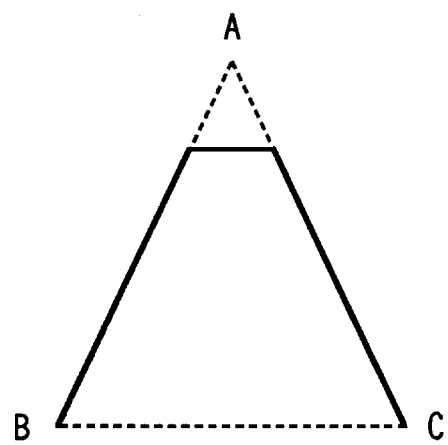
Figure 13C:
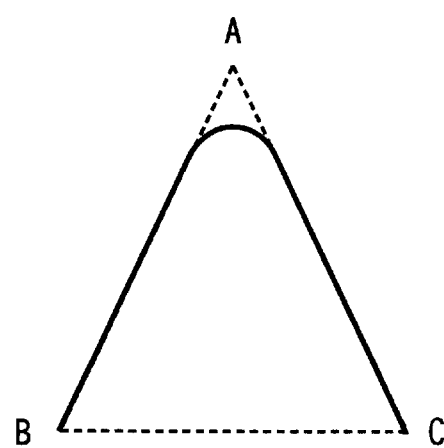

FIGS. 13A, 13B and 13C are schematic views showing cross-sectional shapes of the triangular prism portion.

The triangular prism portion is preferably in the shape of an isosceles triangle formed by vertexes A, B and C, as shown in FIG. 13A. Even if it is changed into a shape of a trapezoid as shown in FIG. 13B because the vertex A is slightly chipped, or it is changed into a shape as shown in FIG. 13C because the vertex A is smoothly curved, for example, the performance of a light guide plate is hardly affected, so that all prisms in these shapes are included in the triangular prism portion in the present invention.

Figure 14:
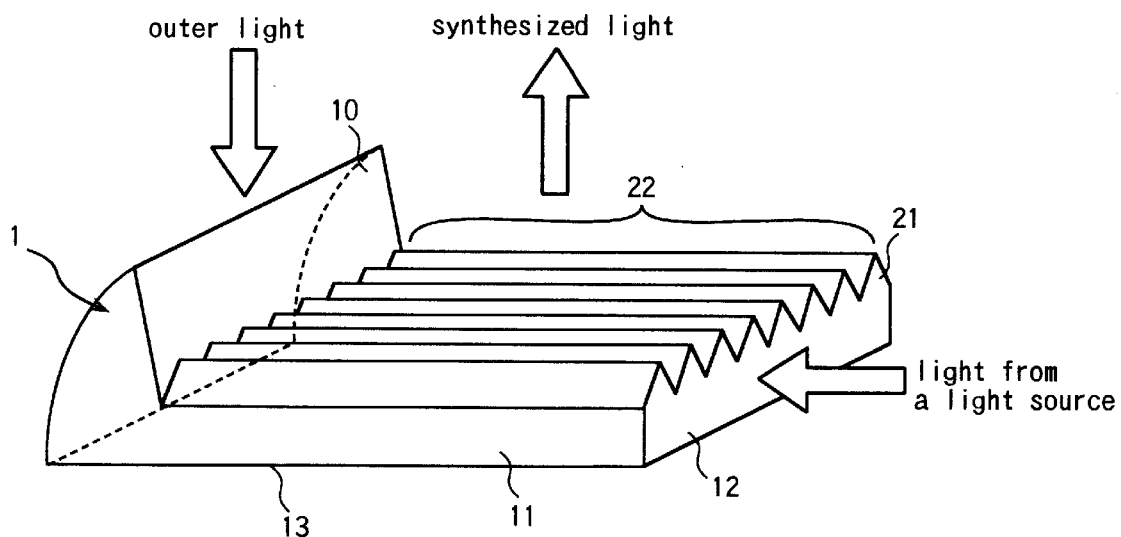
FIG. 14 is a perspective view showing a light guide plate according to the present invention.

FIG. 14 is a perspective view showing a light guide plate in this embodiment applied to the body in the first embodiment of the present invention.

As for a light guide plate 1, when a body of the light guide plate 1 is formed by resin forming with a mold, an outer light collecting portion 10 is also formed on the upper end of the light guide plate 1 and further a first lens portion 22 composed by a plurality of lenticular unit lenses 21 is formed at the same time.

Figure 17:
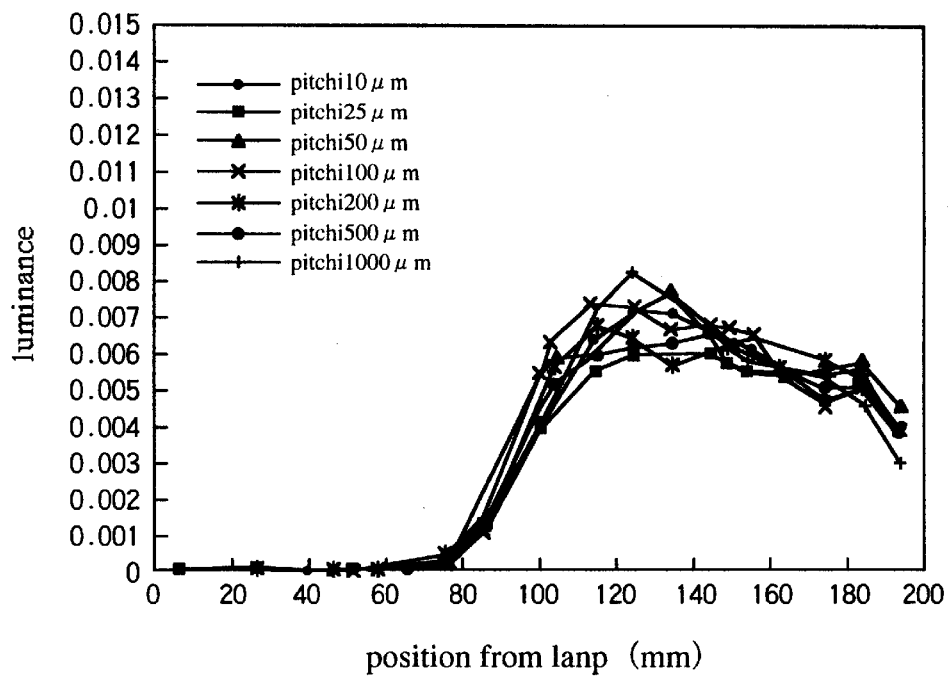
FIG. 17 is a graph showing the change in luminance distribution characteristics with a prism pitch.

The lenticular unit lenses 21 in the first lens portion 22 are triangular prisms, and are so arranged that their respective ridge lines are nearly parallel to each other and are nearly perpendicular to the longitudinal direction of the outer light collecting portion 10. Particularly, the vertical angle of the triangular prism is set in the range of 125° to 165° on the basis of the results of calculation as described later. If the vertical angle of the triangular prism is in the range of 125° to 165°, the performance of the light guide plate 1 is not affected even if there occur deviation and variation in the size, the pitch, the height and the vertical angle of the triangular prism. Particularly, it is found that luminance distribution characteristics are not greatly changed even if the prism pitch is changed in the range of 10 μm to 1000 μm, as shown in FIG. 17.

The outer light collecting portion 10 collects outer light such as the sunlight and room light as a main light. The outer light collecting portion 10 sticks out of the first lens portion 22 to the upper direction of the figure. Therefore, an area of the surface for collecting outer light is enlarged as compared with a conventional light guide plate. The outer light collecting portion 10 has an approximate fan shape in cross section and the end of the outer light collecting portion 10 is a cylindrical lens in a semicircle shape. The effect of a lens enable the outer light collecting portion 10 to collect outer light not only from the above direction but also from the side direction and the upper slant direction effectively. The outer light collecting portion 10 is not limited to a cylindrical lens of a fan shape, for example, but it may be a flat shape in which a lens is not formed and the surface is flat.

Light irradiated from the light source (not shown) which is arranged so as to be adjacent and approximately parallel to the light incidence surface 12 is incident to the light incidence surface 12. The light sources can be provided on either or both of side surfaces 11 to make them light incident surfaces.

As for a light reflection surface 13, a plurality of cones having an approximate shape of a recessed cone are formed at the same time of resin forming, dot pattern printing is carried out after resin forming, and a reflection plate made from Aluminum or the like (not shown) is mounted to prevent light leakage and raise the reflection efficiency.

When the above-mentioned light guide plate is applied, light, that is incident from the outer light collecting portion 10 and from the light incidence surface 12, reflects from the light reflection surface 13 and both side surfaces 11 of a light guide plate 1 and most of the incident light is emitted, in the end, as synthesized light having the even directivity from the first lens portion 22. Leakage prevention materials, such as white tape, is provided with the side surfaces 11 to prevent light leakage.

The material of the light guide plate 1 is selected from transparent materials. Generally, acrylic resin or polycarbonate resin is used. The shape of the light guide plate is parallel and flat plate or flat plate having a wedge shape in cross section. The thickness of the light guide plate is approximately 1 to 10 mm in general.

Examples of the other transparent materials include acrylic ester such as polymethyl methacrylate and polyacrylic acid methyl, methacrylate ester alone or its copolymers, polyester such as polyethylene terephthalate and polybutylene terephthalate, thermoplastic resin such as polycarbonate, polystyrene, and polymethylpentene, acrylate such as multifunctional urethane acrylate and polyester acrylate cross-linked by ultraviolet rays or electron beams, transparent resin such as unsaturated polyester, transparent glass, and transparent ceramics.

The function of a light guide plate of the present invention will be described using the FIG. 14.

The outside sunlight and such outer lights as the fluorescent light in a room are incident to a outer light collecting portion 10 of a light guide plate 1 effectively. When a light source is turned on, light that is incident from the light source through a light incidence surface 12 and outer light which is collected from the outer light collecting portion 10 reflects from a light reflection surface 13 and the two side surfaces 11 of the light guide plate 1. The diffused emitted light entered to the direction of a first lens portion 22 which has a function of converging light are emitted from the first lens portion 22 as a synthesized light having the even directivity in a desired angular range. Accordingly, when a liquid crystal display provided with a light guide plate of the present invention is adopted as a liquid crystal monitor etc. of a digital still camera and a video camera or the like which display images, sufficient lighting can make it unnecessary to turn on a light source, and the reduction of power consumption by such kinds of a camera apparatus itself can be achieved.

FIG. 14 is a graph showing luminance distribution characteristics of a light guide plate of the present invention.

The horizontal axis represents the position of the light guide plate from a lamp as percentage with the length of the light guide plate taken as 100%. A position at a value 0 is a position at an end surface, which is closest to the lamp, of the light guide plate. On the other hand, a position at a value 100 is a position at an end surface, which is farthest from the lamp, of the light guide plate.

The vertical axis represents luminance whose unit is not shown, and means that the larger the value is, the brighter it is.

Figure 15:
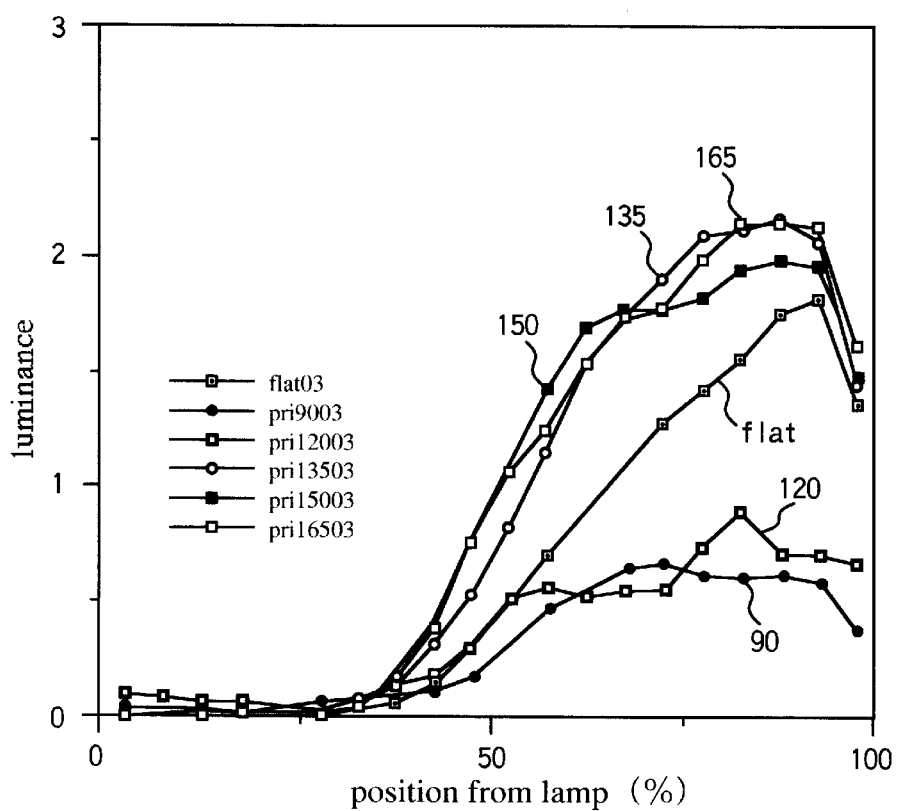
FIG. 15 is a graph showing luminance distribution characteristics.

The graph representing the luminance distribution characteristics shown in FIG. 15 is an analysis of the luminance distribution characteristics of the light guide plate conducted using "CODE-V" which is software for optical design and evaluation developed by Optical Research Associates(ORA) Corporation in the United States, and shows the results of simulation of the luminance distribution characteristics in a case where the wavelength of light irradiated from the lamp is 600 nm, typical PMMA having an index of refraction of 1.49 is used as the material of the light guide plate, and the vertical angle of the triangular prism is changed to 90°, 120°, 135°, 150°, 165° and flat (i.e., no triangular prism) as parameters for evaluation.

As can be made clear from FIG. 15, the luminance distribution characteristics in which the vertical angle is 90° to 120°, which are vertical angles of the lens sheet used together with a conventional light guide plate, are inferior, as compared with the luminance distribution characteristics in which it is flat. Moreover, the luminance distribution characteristics in which the vertical angle is 135° to 165° are substantially improved, as compared with the luminance distribution characteristics in which it is 90° to 120°. Further, the luminance distribution characteristics in which the vertical angle is 135° to 165° are significantly improved. Particularly in the luminance distribution characteristics in which the vertical angle is in the vicinity of 150°, it can be easily understood that a peak effect appears. Even if the wavelength of light and the index of refraction of the material of the light guide plate are slightly changed, the luminance distribution characteristics made clear herein are not greatly affected.

Figure 16:
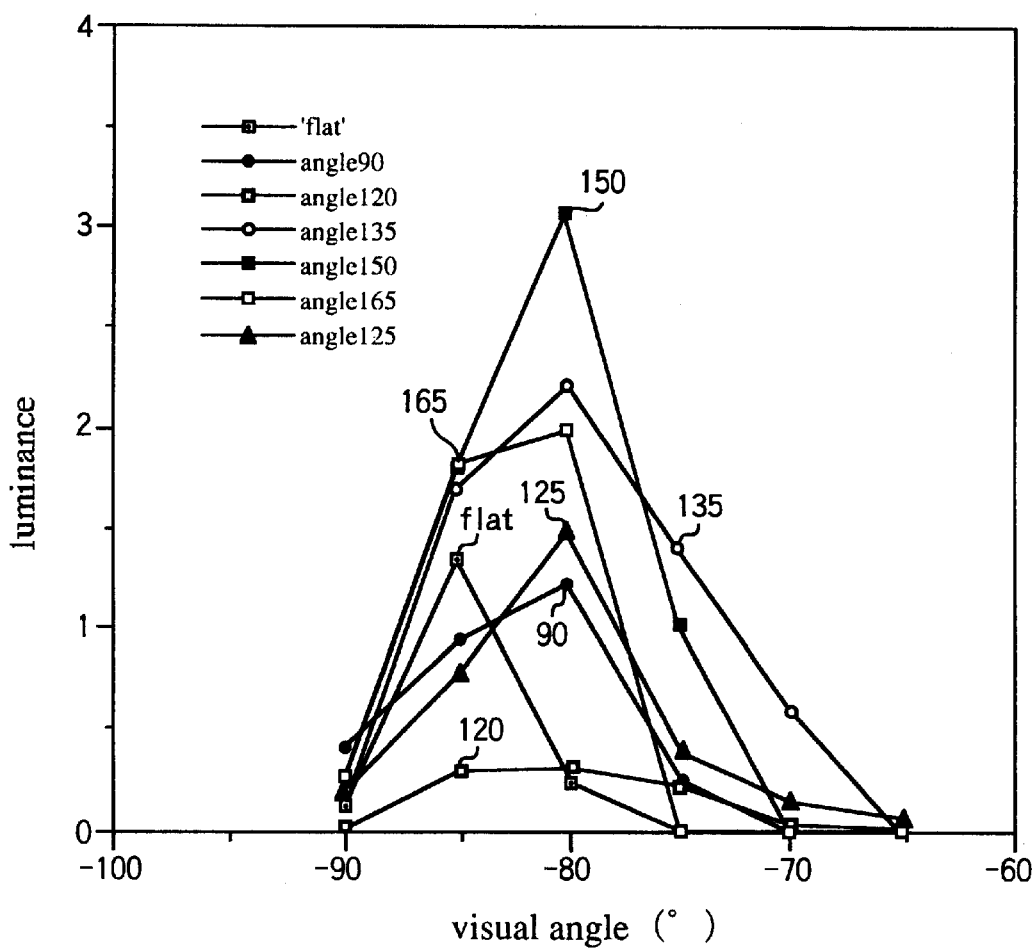
FIG. 16 is a graph showing visual angle characteristics.

FIG. 16 is a graph showing visual angle characteristics.

The horizontal axis represents a visual angle corresponding to the light guide plate, where a value "0" (not shown) means a direction perpendicular to the light guide plate, and a value "−90" means a direction level with the light guide plate.

The vertical axis represents luminance whose unit is not shown, and means that the larger the value is, the brighter it is.

The graph representing the visual angle characteristics shown in FIG. 16 is an analysis of the visual angle characteristics of the light guide plate conducted using "CODE-V" in the same manner as described above, and shows the results of simulation of the luminance distribution characteristics in a case where the wavelength of light irradiated from the lamp is 600 nm, typical PMMA having an index of refraction of 1.49 is used as the material of the light guide plate, and the vertical angle of the triangular prism is changed to 90°, 120°, 125°, 135°, 150°, 165° and flat (i.e., no triangular prism) as parameters for evaluation.

As can be made clear from FIG. 16, when the respective visual angle characteristics in which the vertical angle is 90° and 120°, which are visual angles of the lens sheet used together with a conventional light guide plate are compared with each other, the results in the visual angle characteristics in which the vertical angle is 120° is much inferior to those in the visual angle characteristics in which it is 90°. On the other hand, the visual angle characteristics in which it is 125° to 165° are much improved, as compared with the visual angle characteristics in which it is 90°, so that it can be easily understood that a peak effect appears.

The applicant of the present application has found that the visual angle characteristics are substantially improved when the vertical angle is in the range of 125° to 165° as a result of originally simulating the basic optical design of the light guide plate upon being free from the fixed idea that the vertical angle is in the range of 90° to 120° which are vertical angles of a conventional lens sheet, and has proposed an entirely new light guide plate on the basis of the results.

Figure 18:
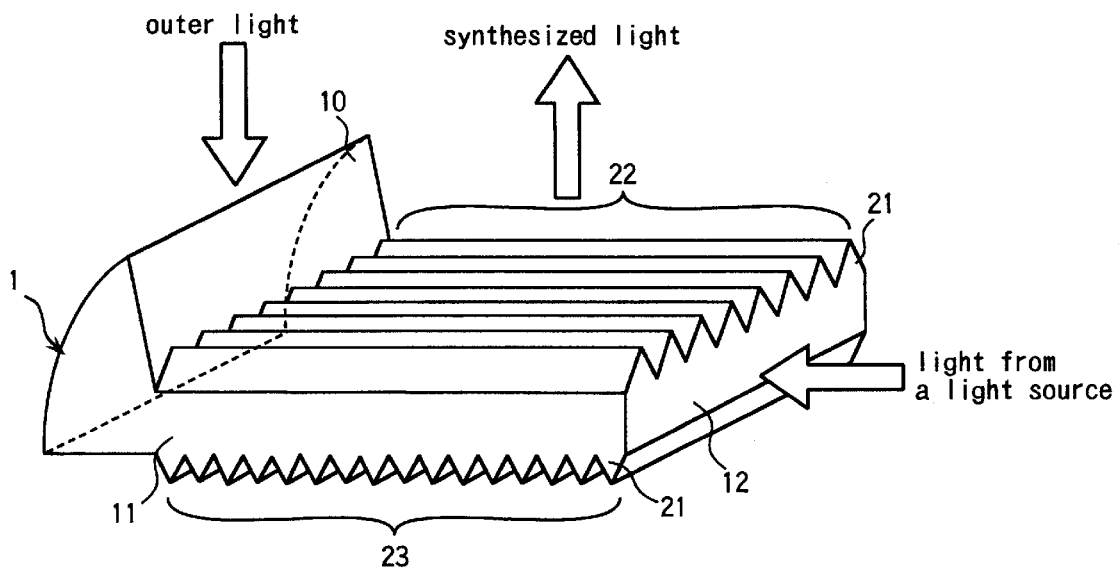
FIG. 18 is a perspective view showing another light guide plate according to the present invention.

FIG. 18 is a perspective view showing a light guide plate of the present invention. The same reference numerals is affixed for the elements that have been already described and the explanation for them is omitted.

A light guide plate 1 is provided with a first lens portion 22 and a second lens portion 23 each comprising a plurality of lenticular unit lenses formed of the same resin as that of the light guide plate 1 at the same time when the light guide plate 1 is formed by resin forming with a mold.

The lenticular unit lenses 21 of the second lens portion 23 are triangular prisms as well as those of the first lens portion 22, and are so arranged that their respective ridge lines are nearly parallel to each other and they are nearly parallel to the longitudinal direction of the outer light collecting portion 10 (that is, they are nearly perpendicular to the lenticular unit lenses 21 of the first lens portion 22). The vertical angle of the triangular prism is set in the range of 125° to 165°. If the vertical angle of the triangular prism is in the range of 125° to 165°, the performance of the light guide plate 1 is not affected even if there occur deviation and variation in the size, the pitch, the height and the vertical angle of the triangular prism.

Furthermore, the lower surface of the second lens portion 23 is subjected to reflective surface processing by aluminum deposition or the like (not shown) so that it does not transmit light.

The function of the light guide plate of the present invention will be described using FIG. 18.

Such outer lights as the outside sunlight and the fluorescent light in a room are incident to an outer light collecting portion 10 of the light guide plate 1 effectively. When a light source is turned on, light that is incident from the light source through a light incidence surface 12 and outer light which is collected from the outer light collecting portion 10 reflect from the lower surface of the second lens portion 23 and the two side surfaces 11 of the light guide plate 1. At that time, the second lens portion 23 has a function of making the light uniform within the light guide plate 1 and introduces the diffused light to the direction of the first lens portion 22.

The diffused emitted light introduced to the direction of the first lens portion 22 which has a function of focusing lights through the second lens portion 23 are emitted from the first lens portion 22 as a synthesized light having the even directivity in the desired angular range. Accordingly, when a liquid crystal display provided with a light guide plate of the present invention is adopted as a liquid crystal monitor etc. of a digital still camera and a video camera or the like which display the image, sufficient lighting can make it unnecessary to turn on a light source, and the reduction of power consumption by such kinds of a camera apparatus itself can be achieved.

The surface light source using the above-mentioned light guide plate is constructed as the same as that described in FIG. 3.

The above-mentioned embodiment describes the application of a light guide plate of the first embodiment shown in FIG. 1. It can be also applied to a light guide plate of the second embodiment in FIG. 5 and the third embodiment in FIG. 9 as well.

In the method of fabricating a light guide plate of the present invention, a process in which the light guide plate is formed by using a mold of a first lens portion 22 treated with fine pattering and a mold of the first lens portion 22 and the second lens portion 23 treated with fine patterning is included, and a plurality of lenticular unit lens formed of the same resin as that of a light guide plate is formed at the time of forming.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light guide plate comprising: a surface for receiving primary light from a light source arranged substantially in parallel therewith, an outer light collecting portion to collect outer light, including sunlight and light from a lighting apparatus remote from the plate, as secondary light, and a light emission surface with emits outer light collected through said outer light collecting portion, said surface for receiving primary light not projecting out from said light emission surface in the direction of light emission, and said outer light collecting portion projecting out from said light emission surface in the direction of light emission.

2. The light guide plate according to claim 1, further comprising:

a light reflection surface which reflects outer light collected through said outer light collecting portion on a surface opposite to said light emission surface.

3. The light guide plate according to claim 2, wherein said outer light collecting portion projects out from both said light reflection surface and said light emission surface.

4. The light guide plate according to claim 3, wherein said outer light collecting portion is thicker than the part of the plate having said light emission surface and said light reflection surface.

* * * * *